Nov. 7, 1961 W. F. NIKLAS ET AL 3,008,064

CATHODE-RAY TUBE

Filed Oct. 28, 1957 3 Sheets-Sheet 1

Inventors
Wilfred F. Niklas
Constantin S. Szegho
By Francis W. Crotty
Attorney

Nov. 7, 1961 W. F. NIKLAS ET AL 3,008,064

CATHODE-RAY TUBE

Filed Oct. 28, 1957 3 Sheets-Sheet 2

Inventors
Wilfrid F. Niklas
Constantin S. Szegho
By Francis W. Crotty
Attorney

CATHODE-RAY TUBE

Filed Oct. 28, 1957 3 Sheets-Sheet 3

Inventors
Wilfrid F. Niklas
Constantin S. Szegho
By Francis W. Crotty
Attorney

1

3,008,064
CATHODE-RAY TUBE

Wilfrid F. Niklas and Constantin S. Szegho, Chicago, Ill., assignors to The Rauland Corporation, a corporation of Illinois Filed Oct. 28, 1957, Ser. No. 692,970
6 Claims. (Cl. 313—82)

This invention relates to a new and improved picture tube and more particularly to an electron gun for a cathode-ray picture tube suitable for use in television receivers and like applications.

In a television receiver, and in other comparable electronic devices in which intelligence is displayed upon the luminescent screen of a cathode-ray picture tube, it is highly desirable to obtain maximum modulation of the light output of the picture tube in response to a given change in amplitude of the control signal applied thereto. It is frequently possible to eliminate or at least to simplify one or more stages of the receiver circuitry if the picture tube affords a relatively large change in beam current and therefore in picture brightness in response to relatively small input signal variations. Stated differently, the picture tube should afford a relatively high transconductance. It is also important, in many instances, to utilize operating voltages which are relatively low, particularly on those electrodes other than the final anode of the tube. In this manner, it is possible to reduce the requirements imposed upon the power supply of the television receiver or like device and therefore to reduce its cost.

In recent years, most television receivers and many similar electronic devices have been designed for cathode modulation. That is, the modulating signal utilized to control the intensity of the electron beam in the picture tube is not applied to the control electrode or electrodes of the tube but rather is supplied to the cathode of the picture tube, the control electrodes being maintained at substantially constant operating potentials. It is possible, for course, to utilize a picture tube designed for grid-modulation operation as a cathode-modulated device. In effect, this is exactly what has been done in the television and related industries, since the cathode-ray tubes presently in commercial use have been constructed in accordance with criteria applicable to grid-modulation operation. Indeed, there has been little if any recognition that the criteria for the construction of a cathode-ray tube intended for cathode modulation are in any way different from those applicable to a cathode-ray tube to be utilized in a grid-modulation circuit. The difficulty is primarily an historical one, the criteria and standards having been initially developed for use in grid-modulation circuits and having been continued in use with relation to cathode-modulated devices.

As a consequence, optimum performance in cathode-modulated picture tubes has not been realized. Fundamentally, this is due to the fact that certain of the factors affecting the transconductance of picture tubes are substantially different for cathode modulation than for grid modulation. The most important factor, and one which is discussed in detail hereinafter, is the penetration factor of the first anode of the picture tube, sometimes referred to as the second grid, with respect to the cathode. In a grid-modulated picture tube, the effective penetration factor of the first anode with respect to the cathode should be relatively low if maximum modulation effect is to be obtained at a minimum input signal level. Applicants have determined that the exact opposite is true in the case of a cathode-modulated picture tube and that the first anode penetration factor should be made very much larger than in previously known cathode-ray tubes.

2

Moreover, applicants have also determined that this may be accomplished without unduly increasing the penetration factor of the final anode of the picture tube with respect to the cathode, thereby avoiding the deleterious effects which may be encountered if high voltage penetration becomes too great.

A principal object of the invention, therefore, is to afford a new and improved high-transconductance electron gun for a cathode-modulated picture tube.

Another object of the invention is to provide a new and improved tetrode electron gun for a cathode-modulated cathode-ray tube which affords superior operational characteristics at a relatively high final anode voltage but with a relatively low first anode voltage.

Another important object of the invention is a new and improved electron gun for a cathode modulated picture tube which affords substantially improved operating characteristics yet permits construction of the electrodes in convenient and economic form.

A specific object of the invention is a new and improved electron gun for a cathode-modulated picture tube which affords substantially improved operating characteristics in an assembly which is relatively simple and economical to fabricate.

Another object of the invention is a new and improved electron gun construction for a cathode-modulated picture tube which provides a lower cut off voltage and at the same time maintains a tightly focused beam affording a relatively small spot size at the picture tube screen.

An electron gun for a cathode-modulated picture tube, constructed in accordance with the invention, comprises a cathode, a first planar-type electrode having an aperture for passing electrons emitted by the cathode, and an anode. The gun further comprises means, including a second planar-type electrode interposed between the first electrode and the anode, for drawing electrons through the first electrode. The second electrode has an aperture for passing electrons which are received through the first electrode. The aperture of the second electrode is substantially smaller than that of the first electrode and is proportioned to provide for the second electrode an increased penetration factor and to provide for the anode a reduced penetration factor.

The expression "planar-type electrode" means an electrode having a dimension in the direction of electron travel which is but a small fraction of its dimension in a plane normal to the direction of electron travel.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figures 1, 2, 3:
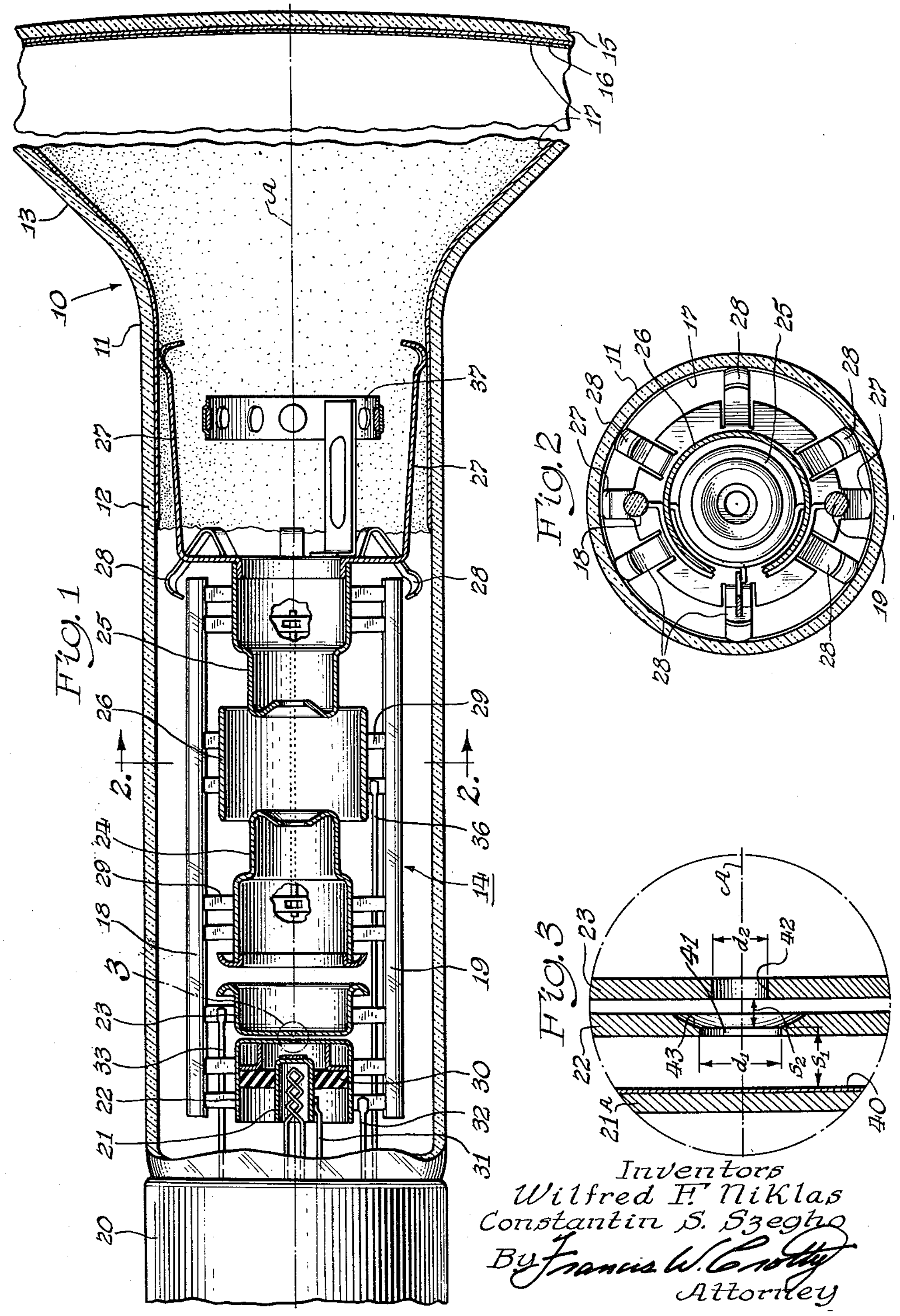
FIGURE 1 is a sectional view partially cut away, of a cathode-ray tube including an electron gun constructed in accordance with one embodiment of the invention.
FIGURE 2 is a sectional view taken along line 2—2 in FIGURE 1.
FIGURE 3 is an enlarged detail view of a portion of the electron gun taken as indicated in phantom outline in FIGURE 1.

The cathode-ray picture tube 10 illustrated in FIGURE 1 comprises an envelope 11 having a neck portion 12 of relatively small diameter connected to an enlarged cone section 13. A substantial portion of the cone section 13 has been cut away to permit an enlarged showing of the electron gun 14 supported within neck section 12 of the envelope. Cone section 13 of the envelope terminates at a face plate 15, only a portion of the face plate being illustrated. The inner surface of face plate 15 is provided with a conventional luminescent coating 16 which is preferably covered by a thin film 17 of aluminum or other metal. Aluminum coating 17 extends along the inner wall of the cone section of the envelope and partially into neck section 12. It should be understood that the invention is in no way restricted to use in an aluminized tube; if preferred, the aluminum or other metal film on the interior surface of the screen 16 may be omitted and a colloidal graphite or other conductive coating may be applied to the inner walls of cone section 13.

Electron gun 14 comprises a series of electrodes which are supported in alignment with each other in conventional manner by means of a pair of insulator support rods 18 and 19 extending longitudinally of neck section 12. In accordance with conventional practice, these electrodes are preferably aligned with the longitudinal axis A of the tube 10. Starting at the base end 20 of the picture tube, the gun electrodes comprise a cathode 21, a first planar-type control electrode 22, a second planar-type control electrode or first anode 23, and a second anode 24. The second anode 24 is electrically connected to the final anode 25 of the electron gun, and a focus electrode 26 is disposed in encompassing relation to the adjacent ends of the anodes 24 and 25. Anode 25 terminates in a series of resilient arms or spring contact fingers 27 which extend into the portion of neck section 12 coated with conductive layer 17 and which engage the conductive layer to afford an electrical connection between coating 17 and anode 25. In addition, anode 25 may include a further series of resilient arms or centering springs 28 which engage the inner wall of neck section 12 to maintain the electron gun in aligned position within the tube neck as indicated in FIGURE 2.

The electrodes 22, 23, 24, 25 and 26 are secured to mounting posts 18 and 19 in conventional manner by a plurality of individual mounting members 29. Cathode cylinder 21 is supported within control electrode 22 by means of an insulator bushing 30 and a heater filament 31 is disposed within the cathode. Individual electrical leads 31, 32, 33 and 36 are provided for electrodes 21, 22, 23 and 26 respectively and are connected to individual pins (not shown) extending from base 20. The cathode-ray tube 10 is also provided with a suitable high voltage connection (not shown) for application of a high voltage to the final anode of the tube comprising electrodes 24 and 25 and conductive coating 17. In addition, the electron gun may be provided with a getter ring 37 of known construction which may be mounted on and electrically connected to anode 25.

As thus far described, picture tube 10 is of conventional construction and is generally similar to a wide variety of cathode-ray tubes which have been utilized commercially in television receivers and in other like applications. There are a number of distinctive features incorporated in electron gun 14, however, which render the gun much more effective than previously known devices when picture tube 10 is utilized in a cathode-modulation circuit. These features may best be understood by reference to FIGURE 3 and by consideration of the structural relationships illustrated therein.

FIGURE 3 is a very greatly enlarged illustration of a minor portion of electron gun 14 and shows the front or face portion 21A of cathode 21 with its emissive coating 40, together with the central portions of the transverse parts of control electrode 22 and first anode 23. As indicated therein, control electrode 22 has a central aperture 41 formed therein which is preferably centered about the axis A of the tube. Control electrode aperture 41 is of substantially concave configuration facing away from cathode surface 21A and has a predetermined minimum diameter $d_1$. First anode 23, on the other hand, is provided with a central aperture 42 which is preferably of circular configuration and has a predetermined diameter $d_2$. Two other parameters of the structure illustrated in FIGURE 3 are of importance with respect to the invention. These are the effective grid-cathode spacing $s_1$ and the interelectrode spacing $s_2$. It should be noted that the critical distance $s_1$ is taken from the surface of cathode coating 40 to the anode side 43 of the minimum diameter portion of aperture 41 and that the distance $s_2$ is taken between point 43 and the surface of electrode 23 most closely adjacent the cathode.

The inventive concept, to a substantial extent, is based upon a determination that the dimensions $s_1$, $s_2$, $d_1$, and $d_2$ are of paramount importance in determining the first anode penetration factor of the electron gun and that this factor may be increased substantially, in a cathode-modulated tube, to increase the perveance of the electron gun. The first anode penetration factor D of the gun may be expressed, as a first approximation, by the following relationship:

$$D=K\left(\frac{d_1^{2.5}}{d_2}\right)\left(\frac{1}{S_1^{0.75}S_2^{0.75}}\right) \quad (1)$$

where K is a constant and, for electron gun structures of the kind most generally used in television picture tubes and similar cathode-ray tubes, is approximately equal to 1.1.

The penetration factor D may also be expressed by the following relationship:

$$D=\frac{V_c}{V_2} \quad (2)$$

in which $V_2$ is the potential difference between the cathode and the first anode of the electron gun and $V_c$ is the negative voltage on the control electrode or grid required for visual extinction of a focused raster extrapolated to zero ultor voltage. Thus, the penetration factor D may be determined experimentally by measuring $V_c$ and $V_2$.

Figure 4:
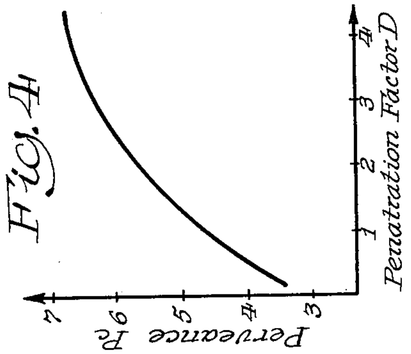
FIGURE 4 is a graphical representation of certain operating characteristics of the electron gun of FIGURE 1.

The effect of variations of the penetration factor D upon the effective perveance $P_c$ of the electron gun 14, in cathode modulation, is illustrated in FIGURE 4. The parameter $P_c$ is determined, in this instance, by the following relationship:

$$I_h=P_c(V_{c'})^{1.5} \quad (3)$$

in which $I_h$ is the maximum beam current at zero drive and bias and $V_{c'}$ is the cutoff voltage at the particular final anode potential employed in operation of the tube.

As indicated in FIGURE 4, the perveance increases with increasing first anode penetration factor. Indeed, the relationship between these two parameters is almost linear for values of the penetration factor D smaller than three. The importance of the operating characteristic illustrated in FIGURE 4 is made apparent by consideration of the fact that cathode-ray picture tubes constructed in accordance with conventional grid-modulation criteria have a first anode penetration factor of the order of 0.16 or even smaller. This is highly understandable because, in a grid-modulation picture tube, the perveance of the electron gun is determined by the expression:

$$P_g = \frac{K_g}{(1+D)^{1.5}} \tag{4}$$

in which $P_g$ is the perveance and $K_g$ is a constant. Moreover, the maximum current which may be developed by the electron gun in a grid-modulated tube is directly proportional to the perveance $P_g$ and it is therefore usually desirable, in a picture tube of the grid-modulation kind, to keep the first anode penetration factor D to a minimum.

The exact opposite is true in the case of a cathode-modulated cathode-ray tube. In this instance, the perveance of the electron gun may be determined approximately in accordance with the following relationship:

$$P_c = K_c(1+D) \tag{5}$$

in which $P_c$ is the perveance of the tube and $K_c$ is a constant. Contrary to the grid-modulation case, in the cathode-modulated tube the perveance increases with increasing values of the first anode penetration factor and, consequently, the maximum beam current may be increased by materially increasing the penetration factor D.

With these considerations in mind, the relationship set forth in Equation 1 is seen to have a controlling effect upon the performance of electron guns in cathode-ray picture tubes intended for cathode-modulation operation. It should be noted that the expression for the penetration factor set forth in Equation 1 is rigorously true only if the following relationship also obtains.

$$s_1 < 0.1d_1 + 0.008 \text{ inch} \tag{6}$$

However, as explained more fully hereinafter, it is usually desirable to construct the electron gun in accordance with Equation 6; moreover, the expression for the first anode penetration factor is only slightly modified when the distance $s_1$ exceeds the value set forth in Equation 6.

The first anode penetration factor D may be increased by changing the dimensional relationship set forth in Equation 1 in several different ways, but the different variations in structural relationship are by no means equivalent to each other from a practical point of view. For example, the effective spacing $s_1$ between cathode 21 and control electrode 22 may be held to a minimum. This is one highly desirable means for effecting the desired increase in the first anode penetration factor, but is subject to practical limits. In this connection, it should be noted that the cathode-control electrode spacing $s_1$ refers to the effective distance between these electrodes, as indicated in FIGURE 3, when the electron gun is at its normal operating temperature. This "hot" spacing is usually substantially less than the corresponding interelectrode spacing when the electron gun is at ambient temperature. Indeed, in many guns the "cold" spacing may be approximately 0.002 inch greater than the "hot" spacing. Consequently, reduction in the effective spacing $s_1$ must be limited to some extent to avoid arcing over between the two electrodes and, as a practical matter, should usually be 0.001 inch plus the thickness of the grid or greater, making the "cold" spacing 0.003 inch plus the thickness of the grid or more.

Another effective means of increasing the first anode penetration factor is to decrease the over-all thickness of the control electrode, at least in the region adjacent aperture 41. This may be accomplished to some extent by the concave configuration illustrated in FIGURE 3, in which the lip of the aperture is substantially thinner than the over-all thickness of the electrode. This expedient is also subject to practical limitations, however, and offers only a limited opportunity for improving the perveance of the electron gun, since the control electrode is conventionally fabricated from relatively thin sheet metal stock. Moreover, this means for increasing the effective perveance of the electron gun, as well as the reduction in the effective interelectrode spacing $s_1$, may introduce substantial difficulties in mass production of the guns.

An increase in the control electrode aperture diameter $d_1$ also increases the perveance of the gun as applied to a cathode-modulation circuit, but leads to a corresponding increase in spot size of the electron beam as it impinges on the luminescent screen 16 of the picture tube (see FIGURE 1). Consequently, very little can be accomplished by this change.

By far the most effective and practical means for increasing the perveance of the cathode-modulation gun without introducing excessive difficulties in manufacturing and without substantial adverse effect upon the spot size or focusing of the electron beam entails a revision of the effective interelectrode spacing $s_2$ and the first anode aperture diameter $d_2$ as compared with previously known gun structures. For this reason, in the electron gun illustrated in FIGURE 1 and shown in partial detail in FIGURE 3, the spacing $s_2$ is held to a minimum consistent with avoidance of arcing between electrodes 22 and 23. At the same time, the anode aperture 42 is substantially reduced in size. In this manner, it is possible to obtain values for the first anode penetration factor D in excess of 0.8, thereby affording very marked advantages in operation as compared with previously known gun structures. Indeed, the first anode penetration factor as defined above may easily be increased to values considerably in excess of unity without introducing undue difficulties in the manufacture of the guns and without noticeably affecting spot size. It should be noted that in these high-perveance cathode-modulated electron guns, the aperture 42 in the first anode should be made substantially smaller than the aperture 41 in the control electrode.

Decreasing the first anode aperture 42 relative to the control electrode aperture 41 affords another substantial advantage in operation of the electron gun 10. The penetration factor for the second anode 24 of the gun decreases in proportion to the cube of the aperture $d_2$, while the first anode penetration factor increases in approximately inverse proportion with respect to $d_2$. Consequently, a substantial reduction in the size of aperture 42 not only increases the first anode voltage penetration factor D, as described hereinabove, but also reduces the ultor voltage penetration with respect to the cathode. This is particularly important because the penetration factor for the second anode 24 determines to a substantial extent the cutoff voltage of the electron gun; reduction in this factor assists materially in providing an electron gun structure having a relatively high perveance. Attempts to construct electron guns for operation at final anode voltages of twelve kilovolts and higher and having a relativly high first anode penetration factor have not been successful and have not afforded the high perveance provided by guns constructed in accordance with the invention. In general, it may be considered that these previously known devices have been unsuccessful because the grid and first anode apertures were of equal size, or the latter larger than the former, producing intolerably high values for the high voltage penetration factor.

Another important consideration is the effect of the reduction in aperture 42 upon the spot size of the electron beam of the gun as it impinges upon luminescent screen 16. The reduction in aperture diameter $d_2$, by reducing the high voltage penetration, would be expected to produce blooming in the highlights of the reproduced image; that is, the spot size could be expected to increase undesirably for relatively high beam currents. In practice, however, this does not occur. In fact, electron guns constructed in accordance with the invention afford a spot size comparable to that of conventional gun structures having much lower perveance values.

Figure 5:
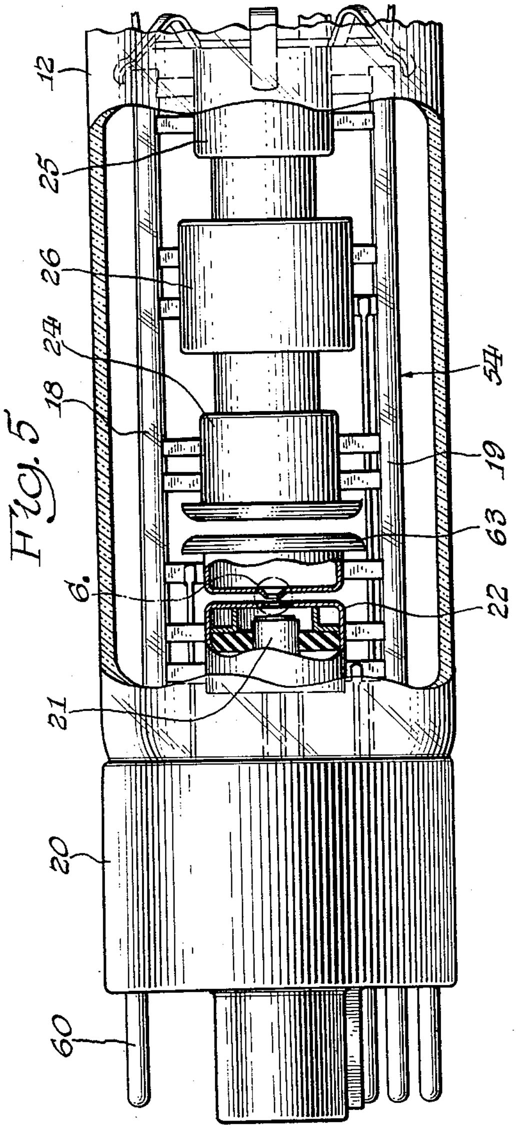
FIGURE 5 is a partial sectional view of the neck portion of a cathode-ray tube illustrating another embodiment of the invention.
Figure 6:
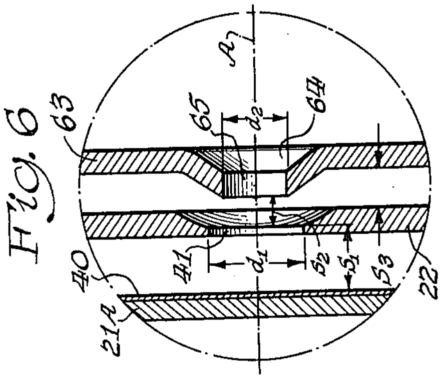
FIGURE 6 is an enlarged detail view of a portion of the electron gun of FIGURE 5 taken as indicated in phantom outline therein.

FIGURES 5 and 6 illustrate another embodiment of the invention which in most respects is quite similar to the embodiments of FIGURES 1 and 2. The electron gun 54 illustrated in FIGURE 5 is substantially similar in many respects to gun 14 of FIGURE 1 and is mounted within the neck section 12 of a picture tube envelope 11. As before, the electron gun includes a cathode 21, a control electrode 22, and a pair of anodes 24 and 25 disposed in the order named along the axis of the tube, the focus electrode 26 being disposed in encompassing relation to the adjacent ends of anodes 24 and 25. The electrodes are mechanically connected to a pair of insulator support members comprising the rods 18 and 19 and are provided with suitable leads, as described hereinabove, which afford electrical connections to the pins 60 of the tube base 20.

The modification of the invention embodied in electron gun 54 lies in the construction and configuration of the first anode 63 of the electron gun and is perhaps best shown in the enlarged detail view, FIGURE 6. As indicated therein, the cathode section 21A is provided with an emissive coating 40 and is disposed in spaced relation to control electrode 22, these electrodes being substantially similar to the structures described hereinabove and illustrated in FIGURE 3. First anode 63, however, is substantially different in configuration, particularly in the portion thereof immediately adjacent the axis A of the tube. The central portion of electrode 63 is deformed or depressed to form a concavity 64 on the side of the electrode remote from emissive surface 40 of the cathode. At the center of the concavity 64, the aperture 65 is provided; this aperture corresponds to anode aperture 42 of FIGURE 3. As in the previously described embodiment, the diameter $d_2$ of aperture 65 is preferably made substantially smaller than the effective diameter $d_1$ of the aperture 41 in control electrode 22. Moreover, and also as in the previously described embodiment, the critical effective interelectrode spacings $s_1$ and $s_2$ are held to a minimum. In the embodiment of FIGURES 5 and 6, however, the external spacing $s_3$ between electrodes 22 and 63 is substantially larger than the effective spacing $s_2$ between these electrodes in the axial portion of the gun. In effect, the modified construction of first anode 63 extends the first anode into the concavity afforded in the control electrode aperture, thereby reducing the effective spacing $s_2$ without a corresponding reduction in the peripheral spacing $s_3$ between the two electrodes. Because the peripheral spacing $s_3$ is relatively large, it is much easier to control the spacing of the two electrodes with respect to each other in the manufacture of the electron gun and thus to control the operating characteristics which are determined to a substantial extent by this parameter. A further advantage of the construction illustrated in FIGURES 5 and 6 is that the desired extremely small spacing $s_2$ is maintained only in an extremely limited area at the center of the two electrodes, thereby substantially reducing the possibility of electrical short circuits between the two electrodes which could be caused by dust particles or by thermal expansion when the electron gun is placed in operation. The conical configuration for the second anode may tend to increase the spot size at the screen of the picture tube to a limited extent, depending upon the curvature of the conical portion of aperture 41 and the angle at which the portion 64 of anode 63 extends toward the control electrode. This effect, however, may be overcome by proper shaping of these two electrodes or by adjusting the strength of the pre-focus lens between electrodes 24 and 63.

Figure 7:
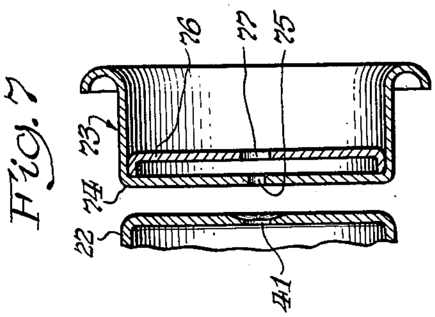
FIGURE 7 is an enlarged detail view of an electrode structure embodying another feature of the invention.

FIGURE 7 illustrates in enlarged detail another form of a first anode electrode which may be utilized to substantial advantage in an electron gun constructed in accordance with the inventive concept. The first anode structure 73 illustrated therein comprises a cup-shaped member 74 which is substantially similar to the previously described first anode 23 of FIGURE 1. As before, the electrode element 74 is provided with a central aperture 75 which is substantially smaller than the corresponding aperture 41 in the adjacent control electrode 22. In this instance, however, anode 73 is provided with a second element 76 which comprises a plate mounted within element 74, the two electrode elements 74 and 76 being electrically and mechanically connected to each other. The auxiliary electrode element 76 is provided with a central aperture 77 which is substantially larger than aperture 75 and may be of approximately the same size as control electrode aperture 41 or larger.

The double-apertured first anode construction illustrated in FIGURE 7 has been found to decrease the high voltage penetration from the second anode 24 (see FIGURE 5) and at the same time to increase the first anode penetration factor D to a substantial extent. Accordingly, an electron gun incorporating a first anode of this construction may be constructed to afford an extremely high perveance in cathode-modulated operation. The effect of the second apertured plate 76 upon the high voltage penetration depends to some extent upon the size of aperture 77 and upon the effective thickness of the electrode. That is, positioning of auxiliary electrode element 76 closer to the screen of the cathode-ray tube results in a decrease in high voltage penetration. Location of second electrode element 76 at too great a distance from aperture 75, however, may result in a substantial increase in the strength of the pre-focus lens of the gun and may therefore lead to an undesirable increase in spot size of the electron beam at the screen of the picture tube. Consequently, auxiliary electrode element 76 should be positioned relatively close to the transverse portion of electrode element 74 as illustrated in FIGURE 7.

Figure 8:
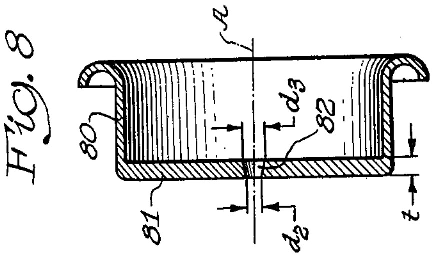
FIGURE 8 is an enlarged detail view, similar to FIGURE 7, of an electrode structure embodying an additional feature of the invention.

FIGURE 8 illustrates another embodiment of a first anode structure incorporating certain of the inventive features and is in many respects essentially equivalent to the first anode structure 73 of FIGURE 7. The electrode 80 illustrated in FIGURE 8 is of substantially cup-shaped configuration but is provided with a forward or cathode-side wall 81 which is substantially thicker than the conventional sheet-metal elements employed in most electron guns. The transverse wall 81 has a central aperture 82 aligned with the aperture 41 in control electrode 22 and having a minimum diameter substantially smaller than the diameter of the control electrode aperture. The walls of the aperture 82 do not extend parallel to axis A of the electron gun in which the electrode is incorporated; rather, aperture 82 is of substantially truncated conical configuration, the screen-side diameter of the aperture being substantially larger than the cathode-side opening. Thus, it will be seen that electrode 80 is essentially similar to the previously described electrode 73 except that the two electrode elements 74 and 76 are combined in a unitary structure having only one wall which extends transversely to the electrode axis. Operationally, the two electrode structures are in most respects substantially equivalent to each other. Solely by way of illustration, and in no sense as a limitation on the invention, the following dimensional data are presented as applied to an electrode of the kind illustrated in FIGURE 8:

| | Inches |
|---|---|
| Thickness $t$ of wall 81 | 0.030 |
| Diameter $d_2$ | 0.031 |
| Diameter $d_3$ | 0.040 |

Figure 9:
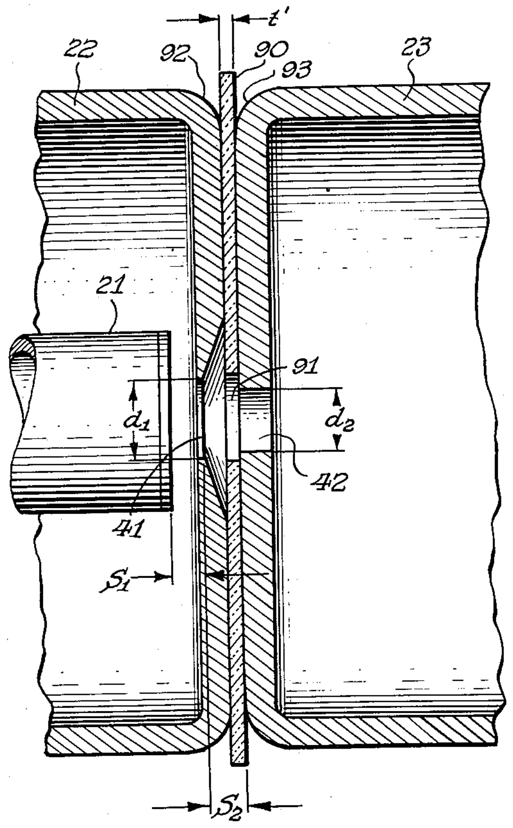
FIGURE 9 is an enlarged detail view of an electrode structure constructed in accordance with another feature of the invention.

FIGURE 9 shows another feature of the invention which is in some respects similar to the arrangement of FIGURE 3 yet affords some further advantages with respect thereto. In this embodiment, the cathode 21 of the electron gun is again disposed in alignment with the aperture 41 in the control electrode 22. The gun structure in this instance further includes the second control electrode or first anode 23 having a central aperture 42 aligned with the aperture 41 in the first control electrode. Consequently, it will be seen that the electrodes themselves are of substantially the same configuration as those illustrated in FIGURE 3.

In this instance, however, an insulating spacer 90 is interposed between control electrode 22 and first anode 23. The spacer 90 is very simple in construction and preferably comprises an extremely thin mica washer having a central aperture 91 which is aligned with the electrode apertures 41 and 42. Preferably, the aperture 91 in the mica washer is made as large as or slightly larger than control electrode aperture 41.

The insulating spacer 90 affords several advantages as applied to commercial manufacture of high-perveance electron guns of the kind described hereinabove. By utilizing a mica washer having a thickness $t'$ which is very small, it is possible to decrease the effective spacing $s_2$ of the two electrodes well below values which could otherwise be safely maintained. Because this construction permits maintenance of extremely small values of spacing $s_2$ in a commercially practical gun, it becomes possible to increase the grid-cathode spacing $s_1$ to some extent and still obtain the high penetration factors necessary to achieve the benefits of the invention. In fact, the construction illustrated in FIGURE 9 makes it possible to increase spacing $s_1$ as much as fifty percent and yet maintain penetration factors well in excess of 0.8.

In this connection, it is important to note that the insulator spacer should extend out beyond the curved edges or corners 92 and 93 of electrodes 22 and 23 respectively. If this is not done, the total leakage path separating the two electrodes is limited to the thickness $t'$ of the insulator spacer and this entire leakage path is exposed to deposition of conductive material when the getter 37 (FIGURE 1) is flashed during processing of the tube. This could easily lead to formation of a relatively high conductive leakage path between the two electrodes and might therefore adversely affect operation of the electron gun. With the illustrated arrangement, the leakage path is very substantially longer and is not so easily contaminated by material vaporized from the getter.

Another important feature of the construction of FIGURE 9 relates to assembly of insulator spacer 90 intermediate electrodes 22 and 23. Because the spacer must be maintained in relatively accurate alignment with the two electrodes, it might be expected that it would be necessary to cement the spacer to one of the electrodes or otherwise secure it in the desired position intermediate the two electrodes. This is not the case. The insulator spacer 90 may be mounted in the illustrated position and maintained in that position securely and safely solely by frictional contact with the two electrodes. So long as care is taken to maintain the insulator spacer in position until the gun is safely mounted within the tube and the tube is evacuated, it remains in position under virtually any conditions of handling to which the picture tube may be subjected. During heat treatment of the electron gun in processing of the tube, control electrode 22 expands and presses insulator washer 90 more tightly against electrode 23, but no damage is sustained by the washer. More importantly, evacuation of the tube envelope greatly increases the frictional forces tending to maintain the washer in contact with the electrodes, and it becomes almost impossible to dislodge insulator spacer 90 from its position once the tube has been evacuated. Consequently, the construction illustrated in FIGURE 9 affords a means for maintaining extremely close tolerances between electrodes 22 and 23 without materially adding to the complexity of the electron gun structure or to its cost of manufacture.

Typical dimensional data for the electrode construction illustrated in FIGURE 9 are set forth hereinafter. As with other similar data included herein, it is to be understood that this materially is presented solely by way of illustration and in no sense as a limitation on the invention.

| | Inches |
|---|---|
| Thickness $t'$ of spacer **90** | 0.002 |
| $s_2$ | 0.008 |
| $s_1$ | 0.010 |
| $d_1$ | 0.036 |
| $d_2$ | 0.031 |

For similar reasons, and also solely by way of illustration, the following data may be considered as an example of suitable dimensions for an electron gun constructed in accordance with the invention with particular reference to the embodiment of FIGURES 1–3.

| | Inches |
|---|---|
| Diameter $d_1$ | 0.036 |
| Diameter $d_2$ | 0.031 |
| Spacing $s_1$ | 0.006 |
| Spacing $s_2$ | 0.013 |

This data is applicable to an electron gun suitable for use in a television picture tube operable at 14,000 to 20,000 volts or higher ultor potential. In a specific electron gun now in commercial production, the normal operating voltage for first anode 23 is approximately 50 volts, the control electrode 22 is usually grounded, and the cutoff voltage is approximately 44 volts.

Cathode-ray picture tubes constructed in accordance with the invention afford substantially increased brightness and much higher transconductance than is obtainable in conventional devices. Typical data obtained by a rigid comparison between two such tubes is set forth hereinafter, as a function of anode current in Table I and as a function of drive voltage with respect to cutoff in Table II.

*Table I*

| Anode Current (microamperes) | Brightness (Foot Lamberts) | |
|---|---|---|
| | Conventional Tube | The Invention |
| 200 | 55 | 55 |
| 400 | 105 | 105 |
| 600 | 160 | 160 |
| 800 | 203 | 215 |
| 1,000 | 235 | 260 |
| 1,200 | 270 | 318 |
| 1,380 | 303 | 375 |
| 1,600 | ---------- | 420 |

(Maximum current for the conventional tube is 1,380 microamperes.)

*Table II*

| Drive From Cutoff (volts) | Brightness (Foot Lamberts) | |
|---|---|---|
| | Conventional Tube | The Invention |
| 20 | 24 | 43 |
| 25 | 40 | 75 |
| 30 | 68 | 117 |
| 35 | 110 | 181 |
| 40 | 171 | 272 |
| 44 | 220 | 420 |

Another useful comparison is provided by data expressing the brightness as a function of the percentage drive, which is set forth in Table III.

*Table III*

| Percentage Drive | Brightness (Foot Lamberts) | |
|---|---|---|
| | Conventional Tube | The Invention |
| 20 | 5 | 9 |
| 40 | 22 | 32 |
| 60 | 70 | 80 |
| 80 | 170 | 190 |
| 90 | 245 | 275 |
| 100 | 303 | 420 |

From the foregoing data, in which two tubes having otherwise essentially similar operating characteristics were rigidly compared, it may be seen that cathode-modulated picture tubes constructed in accordance with the invention afford a substantially higher transconductance than conventional devices and therefore impose less demands upon the signal circuitry utilized to drive the tubes. Moreover, these highly desirable effects are obtained in a gun structure which is simple and economical to manufacture and, indeed, imposes no greater burden upon the tube manufacturer than a conventional electron gun constructed in accordance with grid-modulation criteria. The spot size in picture tubes including electron guns constructed in accordance with the invention is not adversely affected. Electron guns constructed in accordance with the invention and now in commercial production by conventional mass production techniques afford very much higher first anode penetration factors, usually of the order of 1.2 to 1.6, than in any previously known picture tube guns. As a result, the transconductance of these tubes for cathode-modulation operation is very markedly improved, permitting substantial economies in the driving circuits associated therewith.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. An electron gun for a cathode-modulated picture tube comprising: a cathode; a first planar-type electrode having an aperture for passing electrons emitted by said cathode; an anode; and means including a second planar-type electrode interposed between said first electrode and said anode for drawing electrons through said first electrode, said second electrode having an aperture for passing electrons received through said first electrode which aperture is substantially smaller than that of said first electrode and is proportioned to provide for said second electrode an increased penetration factor and to provide for said anode a reduced penetration factor.

2. An electron gun for a cathode-modulated picture tube comprising: a cathode; a first planar-type electrode having a frusto-conically shaped aperture facing away from said cathode for passing electrons emitted by said cathode; an anode; and means including a second planar-type electrode interposed coaxially between said first electrode and said anode for drawing electrons through said first electrode, said second electrode having an aperture for passing electrons received through said first electrode which aperture is substantially smaller than that of said first electrode and is proportioned to provide for said second electrode an increased penetration factor and to provide for said anode a reduced penetration factor.

3. An electron gun for a cathode-modulated picture tube comprising: a cathode; a first planar-type electrode having an aperture with a predetermined minimum diameter $d_1$ for passing electrons emitted by said cathode and having a spacing from said cathode less than 0.1 $d_1$ plus 0.008 inch; an anode; and means including a second planar-type cathode interposed between said first electrode and said anode for drawing electrons through said first electrode, said second electrode having an aperture of a diameter substantially smaller than that of said first electrode to provide for said second electrode an increased penetration factor and to provide for said anode a reduced penetration factor.

4. An electron gun for a cathode-modulated picture tube comprising: a cathode; a first planar-type electrode having an aperture for passing electrons emitted by said cathode; an anode; and means including a second planar-type electrode interposed coaxially between said first electrode and said anode for drawing electrons through said first electrode, said second electrode having an aperture for passing electrons received through said first electrode which aperture is of frusto-conical shape facing away from said first electrode and is of substantially smaller diameter than the aperture of said first electrode to provide for said second electrode an increased penetration factor and to provide for said anode a reduced penetration factor.

5. An electron gun for a cathode-modulated picture tube comprising: a cathode; a first planar-type electrode having a frusto-conically shaped aperture facing away from said cathode for passing electrons emitted by said cathode; an anode; and means including a second planar-type electrode interposed coaxially between said first electrode and said anode for drawing electrons through said first electrode, said second electrode having a frusto-conically shaped projection extending with the small diameter portion thereof facing the central section of the concavity of said first electrode and an aperture of frusto-conical configuration provided in said projection for passing electrons received through said first electrode, said last-mentioned aperture being coaxial with and facing away from said aperture of said first electrode and having a minimum diameter substantially smaller than that of the aperture of said first electrode to provide for said second electrode an increased penetration factor and to provide for said anode a reduced penetration factor.

6. An electron gun for a cathode-modulated picture tube comprising: a cathode; a first planar-type electrode having an aperture for passing electrons emitted by said cathode; an anode; and means including a second planar-type electrode interposed between said first electrode and said anode for drawing electrons through said first electrode, said second electrode comprising a pair of axially spaced and electrically interconnected plates individually having an aperture for passing electrons received through said first electrode, the aperture of the plate closer to said first electrode being substantially smaller than the aperture provided in said first electrode to provide for said second electrode an increased penetration factor and to provide for said anode a reduced penetration factor.

References Cited in the file of this patent

UNITED STATES PATENTS

| | | |
|---|---|---|
| 2,443,916 | Kelar | June 22, 1948 |
| 2,570,165 | Shekels | Oct. 2, 1951 |
| 2,735,032 | Bradley | Feb. 14, 1956 |
| 2,810,851 | Johnson | Oct. 22, 1957 |
| 2,829,299 | Beck | Apr. 1, 1958 |
| 2,852,716 | Lafferty | Sept. 16, 1958 |
| 2,888,588 | Dichter | May 26, 1959 |

FOREIGN PATENTS

| | | |
|---|---|---|
| 707,064 | Great Britain | Apr. 14, 1954 |